(12) United States Patent
Costabello et al.

(10) Patent No.: US 10,157,226 B1
(45) Date of Patent: Dec. 18, 2018

(54) PREDICTING LINKS IN KNOWLEDGE GRAPHS USING ONTOLOGICAL KNOWLEDGE

(71) Applicant: Accenture Global Solutions Limited, Dublin (IE)

(72) Inventors: Luca Costabello, County Kildare (IE); Freddy Lecue, Castleknock (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/872,227

(22) Filed: Jan. 16, 2018

(51) Int. Cl.
*G06F 17/30* (2006.01)
*G06N 5/02* (2006.01)

(52) U.S. Cl.
CPC .. *G06F 17/30734* (2013.01); *G06F 17/30392* (2013.01); *G06F 17/30616* (2013.01); *G06F 17/30646* (2013.01); *G06F 17/30958* (2013.01); *G06N 5/022* (2013.01)

(58) Field of Classification Search
CPC .................. G06F 17/30734; G06F 17/30958
See application file for complete search history.

(56) References Cited

U.S. PATENT DOCUMENTS

| | | | | |
|---|---|---|---|---|
| 8,631,048 B1 * | 1/2014 | Davis | ................ | G06F 17/30292 707/803 |
| 2007/0143285 A1 * | 6/2007 | Drumm | ............. | G06F 17/30914 |
| 2009/0012842 A1 * | 1/2009 | Srinivasan | .......... | G06F 17/2785 705/12 |
| 2010/0121792 A1 * | 5/2010 | Yang | ................. | G06F 17/30958 706/12 |
| 2010/0281061 A1 * | 11/2010 | Chen | ................. | G06F 17/30303 707/794 |
| 2013/0013645 A1 * | 1/2013 | Dias | .................. | G06F 17/30675 707/794 |
| 2013/0297617 A1 * | 11/2013 | Roy | ......................... | G06N 5/02 707/748 |
| 2015/0095303 A1 * | 4/2015 | Sonmez | ................. | G06N 5/003 707/707 |
| 2016/0005197 A1 * | 1/2016 | Walker | .................. | G06T 11/206 345/440 |
| 2016/0224645 A1 * | 8/2016 | Dang | ................. | G06F 17/30569 |

(Continued)

OTHER PUBLICATIONS

Hamaguchi et al., "Knowledge Transfer for Out-of-Knowledge-Base Entities: A Graph Neural Network Approach," https://arxiv.org/abs/1706.05674, arXiv preprint arXiv:1706.05674, Jun. 20, 2017, 7 pages.

(Continued)

*Primary Examiner* — David T. Brooks
(74) *Attorney, Agent, or Firm* — Harrity & Harrity, LLP

(57) ABSTRACT

A device receives training data and an ontology for the training data, where the training data includes information associated with a subject of the ontology. The device generates a knowledge graph based on the training data and the ontology, and converts the knowledge graph into knowledge graph embeddings, where the knowledge graph embeddings include points in a k-dimensional metric space. The device receives a new entity that is not present in the knowledge graph embeddings, and generates a new embedding of the new entity. The device adds the new embedding to the knowledge graph embeddings, and utilizes the knowledge graph embeddings, with the new embedding, to perform an action.

20 Claims, 10 Drawing Sheets

(56) References Cited

U.S. PATENT DOCUMENTS

2016/0328443 A1* 11/2016 Abraham .......... G06F 17/30442
2017/0083507 A1* 3/2017 Ho .................... G06F 17/30401
2017/0337268 A1* 11/2017 Ait-Mokhtar ..... G06F 17/30734

OTHER PUBLICATIONS

Bordes et al., "Translating Embeddings for Modeling Multi-relational Data," Advances in neural information processing systems, 2787-2795, 2013, 9 pages.
Trouillon et al., "Complex Embeddings for Simple Link Prediction," International Conference on Machine Learning, arXiv:1606.06357v1 [cs.AI], 2071-2080, Jun. 20, 2016, 12 pages.
Yang et al., "Embedding Entities and Relations for Learning and Inference in Knowledge Bases," arXiv preprint arXiv:1412.6575, Aug. 29, 2015, 12 pages.
Nickel et al.. "A Review of Relational Machine Learning for Knowledge Graphs," Proceedings of the IEEE 104.1, arXiv:1503.00759v3, 11-33, Sep. 28, 2015, 23 pages.
Cai et al., "A Comprehensive Survey of Graph Embedding: Problems, Techniques and Applications," arXiv preprint arXiv:1709.07604, Jan. 3, 2018, 20 pages.

* cited by examiner

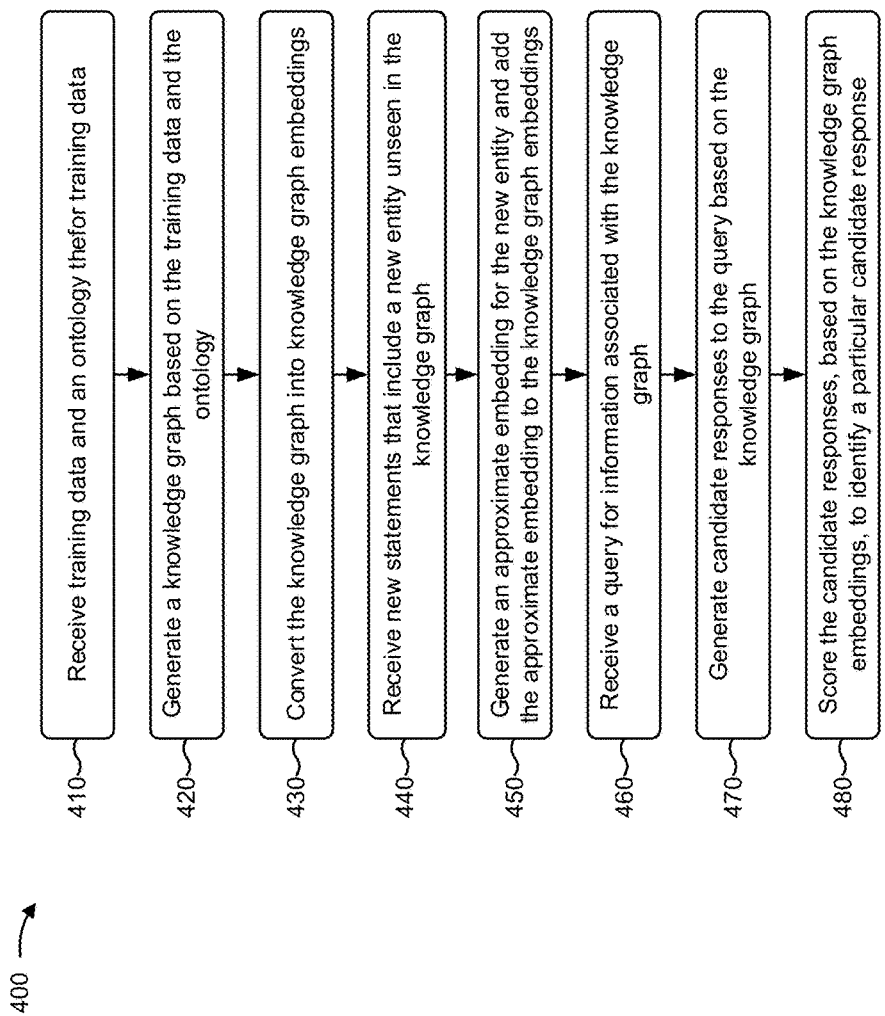

PREDICTING LINKS IN KNOWLEDGE GRAPHS USING ONTOLOGICAL KNOWLEDGE

BACKGROUND

A knowledge graph or an ontology includes types, properties, and interrelationships between entities that exist in a domain of discourse. A knowledge graph compartmentalizes variables needed for some set of computations, and establishes relationships between the variables. The fields of artificial intelligence, systems engineering, software engineering, biomedical informatics, library science, enterprise bookmarking, and/the likes create knowledge graphs or ontologies to limit complexity and organize information. A knowledge density of a knowledge graph is an average number of attributes and binary relations issued from a given entity, and is measured in facts per entity.

SUMMARY

According to some implementations, a device may include one or more memories, and one or more processors, communicatively coupled to the one or more memories, to receive training data and an ontology for the training data, where the training data may include information associated with a subject of the ontology. The one or more processors may generate a knowledge graph based on the training data and the ontology, and may convert the knowledge graph into knowledge graph embeddings, where the knowledge graph embeddings may include points in a k-dimensional metric space. The one or more processors may receive a new entity that is not present in the knowledge graph embeddings, and may generate a new embedding of the new entity. The one or more processors may add the new embedding to the knowledge graph embeddings, and may utilize the knowledge graph embeddings, with the new embedding, to perform an action.

According to some implementations, a non-transitory computer-readable medium may store instructions that include one or more instructions that, when executed by one or more processors, cause the one or more processors to receive a knowledge graph that is generated based on training data and an ontology for the training data, where the training data may include information associated with a subject of the ontology, and the ontology may include classes and properties. The one or more instructions may cause the one or more processors to convert the knowledge graph into knowledge graph embeddings, where the knowledge graph embeddings may include points in a k-dimensional metric space. The one or more instructions may cause the one or more processors to receive a new entity that is not present in the knowledge graph embeddings, and generate revised knowledge graph embeddings that include an embedding for the new entity. The one or more instructions may cause the one or more processors to receive a query for information associated with the knowledge graph, and generate candidate responses to the query based on the knowledge graph. The one or more instructions may cause the one or more processors to score the candidate responses based on the revised knowledge graph embeddings, and identify a particular candidate response, of the candidate responses, based on scores for the candidate responses.

According to some implementations, a method may include receiving, by a device, training data and an ontology for the training data, where the training data may include information associated with a subject of the ontology, and the ontology may include classes and properties. The method may include generating, by the device, a knowledge graph based on the training data and the ontology, and converting, by the device, the knowledge graph into knowledge graph embeddings, where the knowledge graph embeddings may include points in a k-dimensional metric space. The method may include receiving, by the device, a new entity that is not present in the knowledge graph embeddings, and generating, by the device, revised knowledge graph embeddings that include a new embedding for the new entity. The method may include utilizing, by the device, the revised knowledge graph embeddings to perform an action.

BRIEF DESCRIPTION OF THE DRAWINGS

FIG. 4 is a flow chart of an example process for predicting links in knowledge graphs using ontological knowledge.

DETAILED DESCRIPTION

The following detailed description of example implementations refers to the accompanying drawings. The same reference numbers in different drawings may identify the same or similar elements.

A knowledge graph is an expressive, schema-rich, domain-independent data modeling paradigm that is particularly well-suited to model relations between entities. In machine learning, knowledge graph embedding models predict existences of labeled links between entities. Such predictions are a result of operations between points (e.g., known as embeddings) in a metric space. The embeddings are learned from the entire knowledge graph during training of the knowledge graph. However, a knowledge graph embedding model is unable to predict links associated with a new unknown entity. In such cases, an embedding model of the knowledge graph cannot predict the links because the unknown entity is not known during the training of the knowledge graph, and the embedding model did not learn a corresponding representation in the metric space. Some techniques handle unknown entities by completely retraining the knowledge graph. Unfortunately, such techniques consume significant time and resources (e.g., processors, memory, and/or the like) in order to retrain the knowledge graph.

Some implementations described herein provide a prediction platform that predicts links in knowledge graphs using ontological knowledge and without retraining the knowledge graphs. For example, the prediction platform may receive training data and an ontology for the training data, and may generate a knowledge graph based on the training data and the ontology. The prediction platform may convert the knowledge graph into knowledge graph embeddings, and may receive new statements (e.g., that include new entities) that are not present in the training data and among the knowledge graph embeddings. The prediction platform may generate approximate embeddings for each new entity, and may generate revised knowledge graph embeddings that include the new statements. The prediction platform may receive a query for information associated with the knowledge graph, and may generate candidate responses to the query based on the knowledge graph. The prediction platform may score the candidate responses based on the revised knowledge graph embeddings, and may identify a particular candidate response, that best answers the query, based on scoring the candidate responses.

Figure 1A:
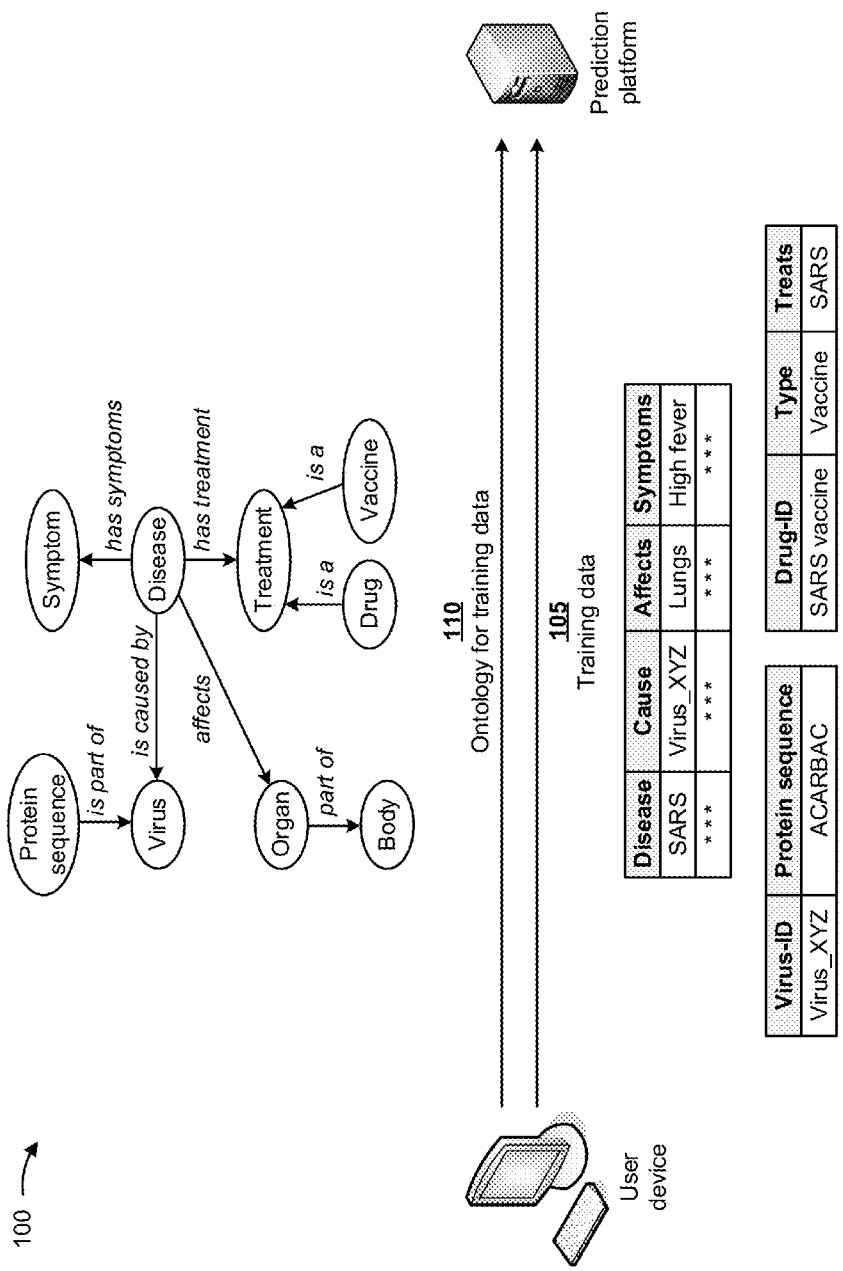
FIGS. 1A-1G are diagrams of an overview of an example implementation described herein.

FIGS. 1A-1G are diagrams of an overview of an example implementation 100 described herein. As shown in FIG. 1A, a user device may be associated with a prediction platform. As shown in FIG. 1A, and by reference number 105, a user of the user device (e.g., via a user interface provided to the user) may cause the user device to provide, to the prediction platform, training data for training a knowledge graph associated with a particular disease (e.g., severe acute respiratory syndrome (SARS)). As further shown in FIG. 1A, and by reference number 110, the user may cause the user device to provide, to the prediction platform, an ontology for the training data. In some implementations, the training data and the ontology may not be stored in the user device, but the user device may cause the training data and the ontology to be provided from a resource, storing the training data and the ontology, to the prediction platform. In some implementations, the training data and the ontology may be stored in the prediction platform. In some implementations, although FIGS. 1A-1G relate to healthcare and biomedical domains, the prediction platform may be used with any type of domain and may be domain agnostic.

In some implementations, the training data may include information associated with a subject of the ontology. For example, example implementation 100 relates to an ontology associated with the SARS disease. Thus, the training data may include data associated with the SARS disease that is received from relationship database management systems (RDBMS), comma-separated values (CSV) data stores, and/or the like. As shown in FIG. 1A, the training data may include data indicating a disease (e.g., SARS), a cause of the disease (e.g., virus_XYZ), what organ the disease affects (e.g., lungs), symptoms of the disease (e.g., high fever), a virus identifier (e.g., virus_XYZ), a protein sequence associated with the virus (e.g., ACARBAC), a drug identifier associated with a drug that treats the disease (e.g., SARS vaccine), a drug type (e.g., vaccine), what the drug treats (e.g., SARS), and/or the like.

The ontology (e.g., resource description framework (RDF) ontology, web ontology language (OWL), and/or the like) for the training data may include classes, types, properties, and interrelationships (e.g., relations) between data of the training data. For example, as shown in FIG. 1A, the ontology may include nodes that represent concepts related to a disease, and edges or links that show interrelationships (e.g., relations) between the concepts related to the disease. As shown, a disease node may connect to a symptom node, and a link between the nodes may indicate that the disease has symptoms. The disease node may connect to a treatment node, and a link between the nodes may indicate that the disease has a treatment. The disease node may connect to a virus node, and a link between the nodes may indicate that the disease is caused by the virus. The disease node may also connect to an organ node, and a link between the nodes may indicate that the disease affects the organ. The virus node may connect to a protein sequence node, and a link between the nodes may indicate that the protein sequence is part of the virus. The organ node may connect to a body node, and a link between the nodes may indicate that the organ is part of the body. The treatment node may connect to a drug node and a vaccine node, and the links between the nodes may indicate that the drug and the vaccine are treatments for the disease.

Figure 1B:
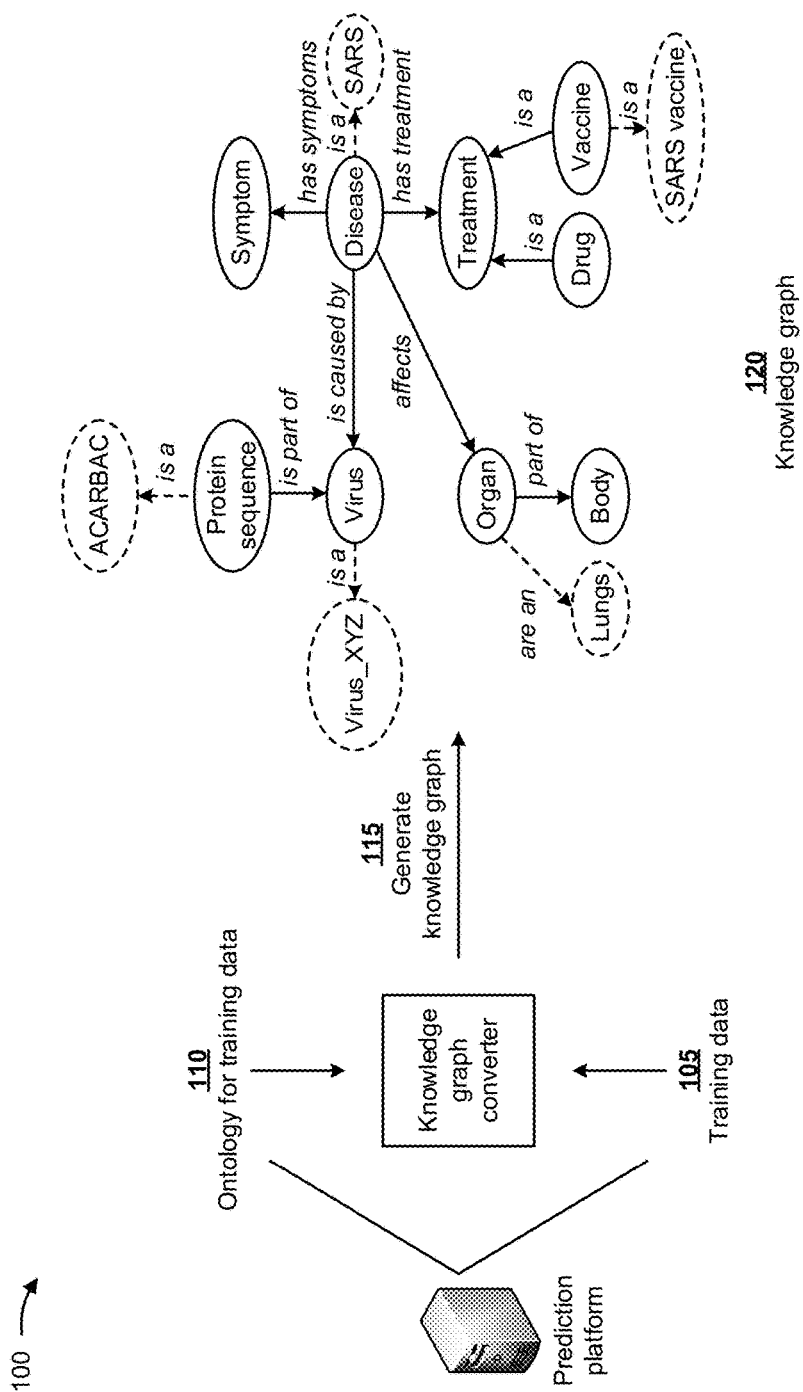

As shown in FIG. 1B, and by reference numbers 105 and 110, the training data and the ontology may be provided to a knowledge graph converter of the prediction platform. In some implementations, the knowledge graph converter may receive the training data and the ontology, and may convert the training data from a format received by the prediction platform (e.g., a relational database format, a CSV format, and/or the like) into another format (e.g., a resource descriptive framework (RDF) format). In some implementations, the knowledge graph converter may aggregate the converted training data so that the knowledge graph converter may process the aggregated data.

As further shown in FIG. 1B, and by reference number 115, the knowledge graph converter may generate a knowledge graph based on the training data and the ontology (e.g., based on the converted and aggregated training data and the ontology). In some implementations, the knowledge graph converter may utilize a schema matching technique to align the training data and to integrate the aligned training data into the ontology (e.g., to generate the knowledge graph). The schema matching technique may include determining semantic correspondences between elements of two schemas (e.g., the training data and the ontology). In some implementations, the schema matching technique may analyze and compare the schema to determine correspondences among concepts and to detect possible conflicts. Once the conflicts are detected, the schema matching technique may resolve the conflicts so that merging of the schemas is possible. Once the conflicts are resolved, the schema matching technique may merge the schemas. In some implementations, the schema matching technique may include a schema-level matching technique (e.g., that considers schema information and not instance data), an instance-level matching technique (e.g., that use instance-level data to gather insights into contents and meanings of schema elements), a hybrid matching technique (e.g., that combines several matching techniques to determine match candidates based on multiple criteria or information sources), a reusing matching information technique (e.g., that reuses previous matching information as auxiliary information for future matching tasks), and/or the like.

In some implementations, the knowledge graph converter may utilize other techniques to align the training data and to integrate the aligned training data into the ontology (e.g., to generate the knowledge graph), such as machine learning techniques, and/or the like.

As further shown in FIG. 1B, and by reference number 120, the knowledge graph may include the training data integrated within the ontology as nodes that represent concepts, and edges or links that show interrelationships (e.g., relations) between the concepts. For example, in addition to the information conveyed by the ontology, the knowledge graph may indicate that SARS is an instance of Disease, that ACARBAC is an instance of a protein sequence, that virus_XYZ node is an instance of a Virus, that lungs are an instance of an Organ, and that SARS vaccine is an instance of Vaccine. Thus, the knowledge graph may indicate that SARS is a disease with a vaccine treatment by the SARS vaccine.

Figure 1C:
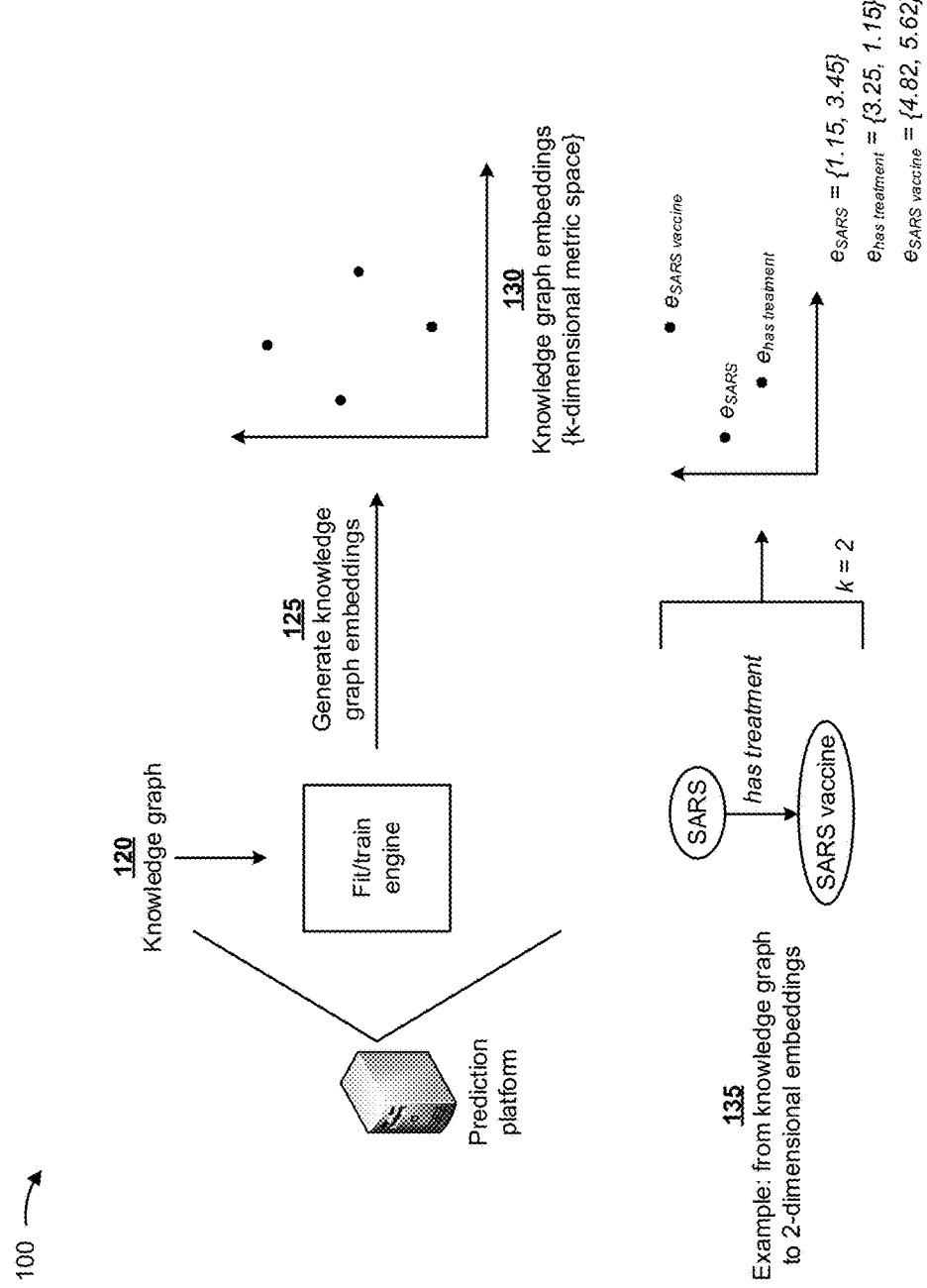

As shown in FIG. 1C, and by reference number 120, a fit/train engine, of the prediction platform, may receive the knowledge graph. In some implementations, the knowledge graph may be serialized into a list of statements, and the list of statements may be received by the fit/train engine. As further shown in FIG. 1C, and by reference number 125, the fit/train engine may generate knowledge graph embeddings based on the knowledge graph. In some implementations, the knowledge graph embeddings may include points in a k-dimensional metric space, and may provide latent semantic representations for structured knowledge in the knowledge graph. In some implementations, the knowledge graph embeddings may enable direct explicit relational inferences among entities via simple calculation of embedding vectors, and may be effective at highlighting key concepts underlying sophisticated human language.

In some implementations, the fit/train engine may convert entities (e.g., nodes) and relations (e.g., links or edges) of the knowledge graph into points in a k-dimensional metric space. For example, as shown in FIG. 1C, and by reference number 130, the knowledge graph embeddings may include points in a k-dimensional metric space (e.g., shown as a graph in two dimensions for simplicity). In some implementations, the fit/train engine may minimize a loss function to learn model parameters that best discriminate positive statements from negative statements. In such implementations, the loss function may include a function that maps a statement onto a real number that represents the likelihood of that statement to be true. In such implementations, the loss function may include a pairwise margin-based loss function, a negative log-likelihood loss function, and/or the like. In some implementations, the fit/train engine may assign scores to statements of the knowledge graph in order to aid the loss function in determining how well the knowledge graph tells positive statements from negative statements. In some implementations, the fit/train engine may minimize the loss function in order to determine optimal parameters of the knowledge graph (e.g., the knowledge graph embeddings).

As further shown in FIG. 1C, and by reference number 135, an example knowledge graph in two dimensions (e.g., k=2) may indicate that a SARS vaccine is a treatment for SARS. In such an example, the fit/train engine may generate three knowledge graph embeddings (e.g., points) on a two-dimensional metric space. As further shown, the three points may include a point representing SARS (e.g., located at {1.15, 3.45}), a point representing that SARS has a treatment (e.g., located at {3.25, 1.15}), and a point representing the SARS vaccine (e.g., located at {4.82, 5.62}).

Figure 1D:
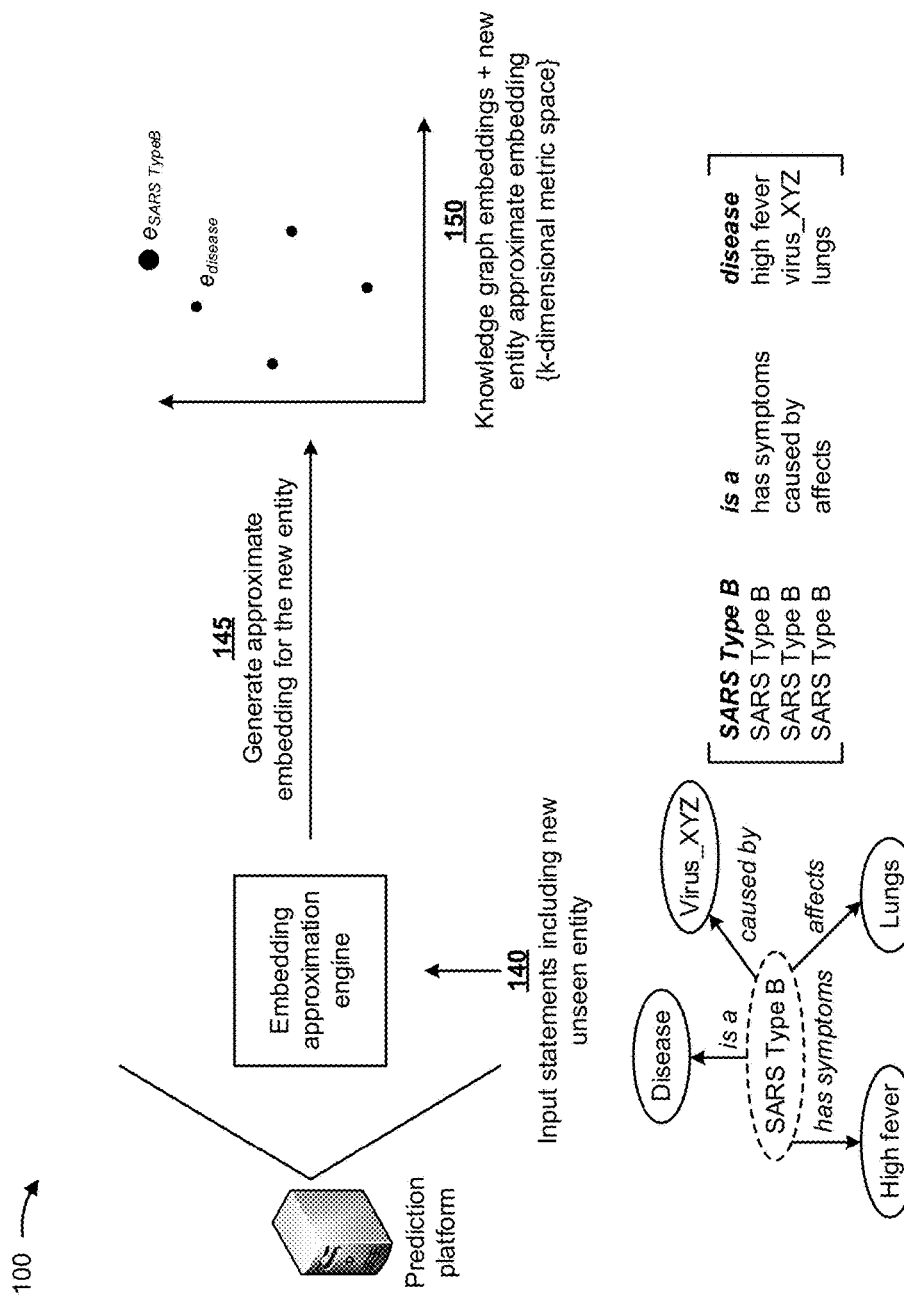

As shown in FIG. 1D, and by reference number 140, assume that the prediction platform receives (e.g., from the user device) new statements, indicating among all that SARS Type B is a disease. As further shown, such input may include ontology-related statements. In some implementations, the ontology may include a SARS Type B node that connects to a disease node, and a link between the nodes may indicate that SARS Type B is a disease. The SARS Type B node may connect to a virus_XYZ node, and a link between the nodes may indicate that SARS Type B is caused by virus_XYZ. The SARS Type B node may connect to a high fever node, and a link between the nodes may indicate that SARS Type B has a high fever as a symptom. The SARS Type B node may connect to a lungs node, and a link between the nodes may indicate that SARS Type B affects the lungs. In some implementations, a serialized representation of the ontology-related statements may indicate the same information in a different format.

Previously, such new statements were unable to be scored because at least one unseen entity was not included in the training data, the original knowledge graph, and the knowledge graph embeddings, i.e., SARS Type B. However, as further shown in FIG. 1D, and by reference number 145, an embedding approximation engine, of the prediction platform, may receive the new unseen entity, and may generate knowledge graph embeddings revised with the embedding of the unseen entity.

In some implementations, the embedding approximation engine may approximate an embedding for the new entity based on a weight (e.g., >1), the average of the embeddings of the entities that belong to the schema (e.g., the ontology), and are related to the new entity (e.g., the entity "disease" shown in bold and italics in FIG. 1D), and the average of the embeddings of entities that are in the ontology, are related to the new entity but that do not belong to the schema, (e.g., the remaining entities that belong to the statements shown in FIG. 1D, other than the entity "disease").

In some implementations, the embedding approximation engine may approximate an embedding for the new entity ($e_{new}$ or $e_{sARs\_TypeB\_is\_a\_disease}$) based on the following equation:

$$e_{new} = \alpha \frac{1}{|\eta_s|} \sum_{s}^{|\eta_s|} e_s + \frac{1}{|\eta_e|} \sum_{i}^{|\eta_e|} e_i,$$

where $\alpha$ may correspond to the weight (e.g., >1), $$\frac{1}{|\eta_s|} \sum_{s}^{|\eta_s|} e_s$$

may correspond to the average of the entity embeddings that are related to the new entity, and are related to the schema, $$\frac{1}{|\eta_e|} \sum_{i}^{|\eta_e|} e_i$$

may correspond to the average of the entity embeddings that are related to the new, unseen entity, and are not related to the schema, $\eta_s$ may correspond to the entities that are related to the new, unseen entity, and are related to the schema, $\eta_e$ may correspond to all other entities that are related to the new entity, and are not related to the schema, $e_s$ may correspond to an embedding of an entity in the schema, and $e_i$ may correspond to an embedding of an entity not in the schema. Thus, the embedding approximation engine may apply more weight to the entities that are related to the schema than to the entities that are not related to the schema.

As further shown in FIG. 1D, and by reference number 150, the revised knowledge graph embeddings may include points in the k-dimensional metric space (e.g., shown as a graph in two dimensions for simplicity), and may include points (e.g., embeddings) calculated for the new entity (e.g., $e_{SARS\_TypeB}$) and for the disease node (e.g., $e_{disease}$).

Figure 1E:
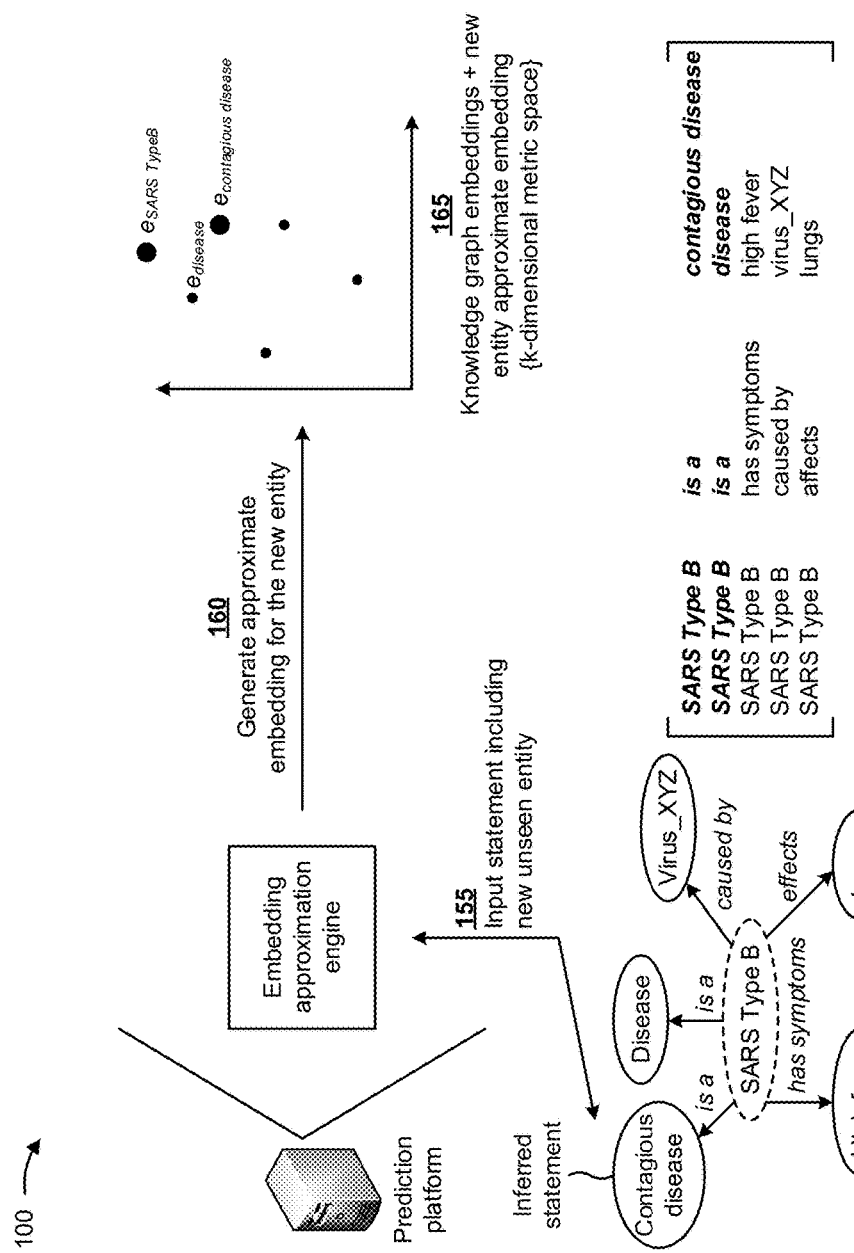

With reference to FIG. 1E, in some implementations, the prediction platform may expand a number of schema-related entities utilized by the embedding approximation engine, by utilizing reasoning techniques (e.g., techniques that generate conclusions from available knowledge using logical techniques such as deduction and induction) to infer a new entity (e.g., SARS Type B is a contagious disease). In such implementations, the prediction platform may modify $\eta_s$ (e.g., which may correspond to the entities that are in the ontology) based on the following equation:

$$\eta_s = \eta_s^{original} + \eta_s^{inferred},$$

where $\eta_s^{original}$ may correspond to $\eta_s$ described above in connection with FIG. 1D (e.g., which may correspond to the entities that are in the ontology), $\eta_s^{inferred}$ may correspond to the inferred entities (i.e., entities that belong to inferred new statements), and $\eta_s$ may correspond to the expanded set of entities related to the new, unseen entity.

As further shown in FIG. 1E, and by reference number 155, the prediction platform may provide, to the embedding approximation engine, the new statements indicating, among all, that SARS Type B is a contagious disease. As further shown, the new entity may include an ontology and a serialized representation of the ontology. In some implementations, the ontology may include the ontology described above in connection with FIG. 1D. The SARS Type B node may also be part of a new inferred statement (e.g., SARS Type B is a contagious disease). In some implementations, the serialized representation of the ontology may indicate the same information as the ontology in a different format, but may also include the statement "SARS Type B is a contagious disease." The statements "SARS Type B is a disease" and "SARS Type B is a contagious disease" are shown in bold and italics in FIG. 1E to indicate that these statements are related to the schema, while remaining statements are not related to the schema.

As further shown in FIG. 1E, and by reference number 160, an embedding approximation engine, of the prediction platform, may receive the new statements, and may generate revised knowledge graph embeddings for the unseen entity included in the new statements, in the manner described above in connection with FIG. 1D. As further shown in FIG. 1E, and by reference number 165, the revised knowledge graph embeddings may include points in the k-dimensional metric space (e.g., shown as a graph in two dimensions for simplicity), and may include a point (e.g., an embedding) calculated for the new, unseen entity (e.g., $e_{contagious\_disease}$).

Figure 1F:
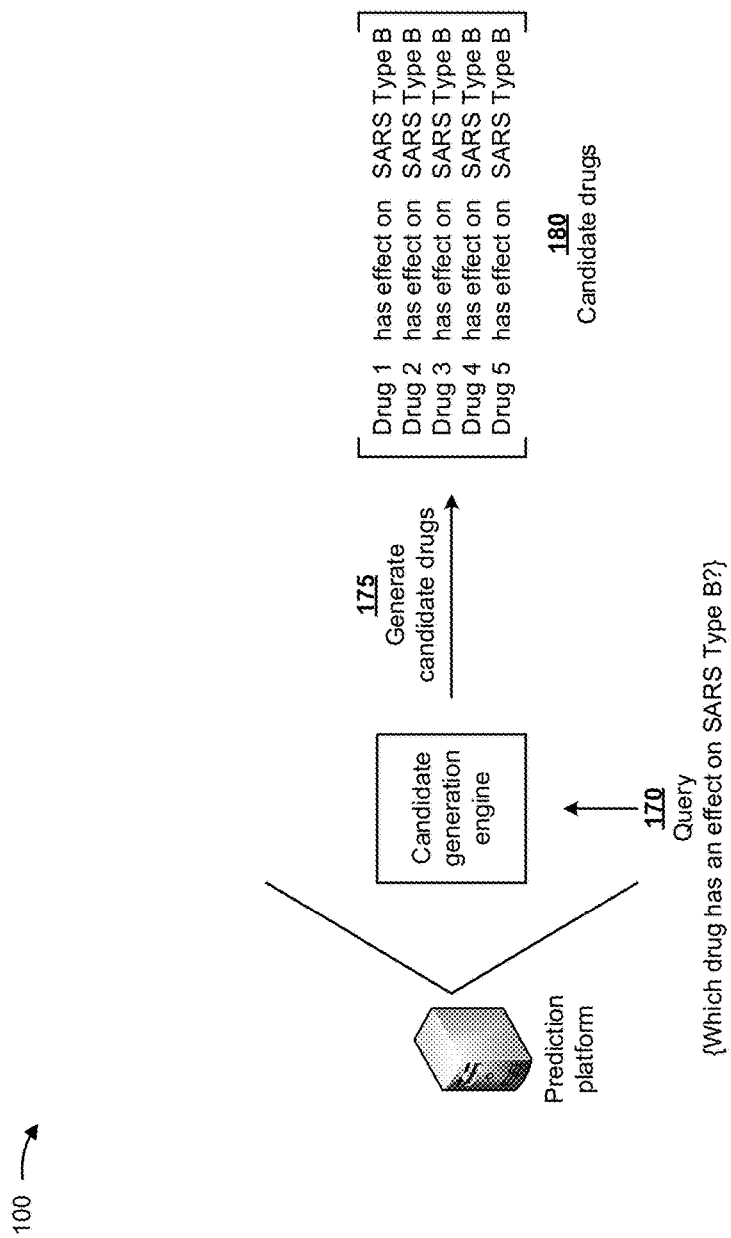

As shown in FIG. 1F, and by reference number 170, a candidate generation engine, of the prediction platform, may receive a query to identify a drug that has an effect on SARS Type B. In some implementations, the candidate generation engine may analyze the query based on the knowledge graph to determine drugs that have an effect on SARS. As further shown in FIG. 1F, and by reference number 175, the candidate generation engine may generate information indicating candidate drugs based on the query and based on the analysis with the knowledge graph. As further shown in FIG. 1F, and by reference number 180, the information indicating the candidate drugs may be generated in a particular format (e.g., a statements serialization or format) and may indicate that drugs 1-5 are potential candidates as having an effect on SARS Type B.

Figure 1G:
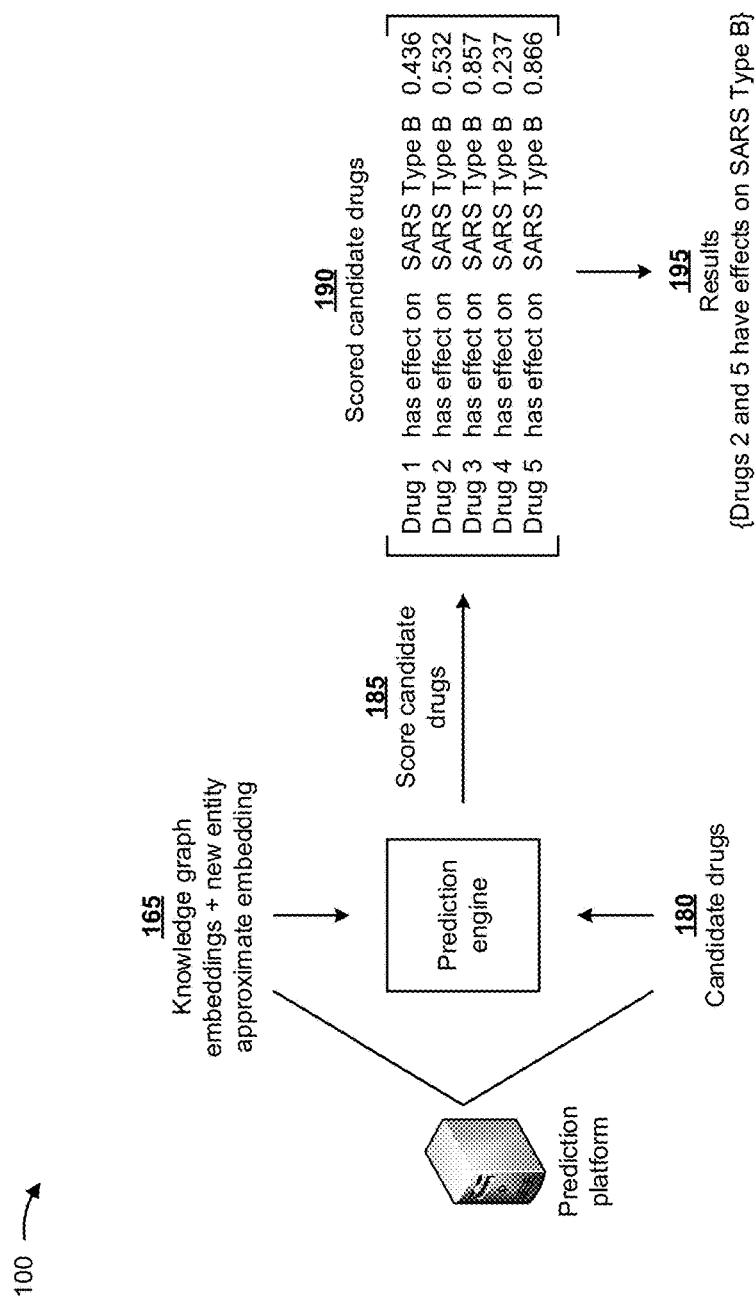

As shown in FIG. 1G, and by reference numbers 165 and 180, a prediction engine, of the prediction platform, may receive the revised knowledge graph embeddings (e.g., described above in connection with to FIG. 1E) and the candidate drugs (e.g., described above in connection with FIG. 1F). In some implementations, and as shown by reference number 185 in FIG. 1G, the prediction engine may score the candidate drugs based on the revised knowledge graph embeddings. In such implementations, the prediction engine may utilize a relational learning model (e.g., TransE, RESCAL, ComplEx, DistMult, HolE, and/or the like) to determine values associated with the candidate statements (e.g., scores). The prediction engine may then utilize the values to calculate the probability estimates for the candidate drugs.

As further shown in FIG. 1G, and by reference number 190, the prediction engine may provide the scored candidate drugs in a particular format. In some implementations, the scored candidate drugs may include the information included in the candidate drugs and may also include the scores for the candidate drugs (e.g., drug 1 has a score of 0.436, drug 2 has a score of 0.532, drug 3 has a score of 0.857, drug 4 has a score of 0.237, and drug 5 has a score of 0.866).

As further shown in FIG. 1G, and by reference number 195, the prediction engine may calculate results for the scored candidate drugs. In some implementations, the prediction engine may utilize a predetermined threshold for a score (e.g., 0.85) to calculate the results, where if a candidate drug has a score that satisfies the predetermined threshold, the prediction engine may output that candidate drug as being a drug that has an effect on SARS Type B. For example, since drugs 2 and 5 have scores greater than the predetermined threshold, the prediction engine may output drugs 2 and 5 as having an effect on SARS Type B. In some implementations, the prediction platform may provide the scored candidate drugs and/or the results to the user device, and the user device may display the scored candidate drugs and/or the results to a user of the user device (e.g., via a user interface).

In this way, several different stages of the process for predicting links in knowledge graphs are automated, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were not previously performed or were previously performed using subjective human intuition or input. These roles may include predicting links in knowledge graphs without having to retrain the knowledge graphs, utilizing the predicted links to answer queries, and/or the like. Finally, automating the process for predicting links in knowledge graphs conserves computing resources (e.g., processors, memory, and/or the like) that would otherwise be wasted in retraining the knowledge graphs.

As indicated above, FIGS. 1A-1G are provided merely as examples. Other examples are possible and may differ from what was described with regard to FIGS. 1A-1G.

Figure 2:
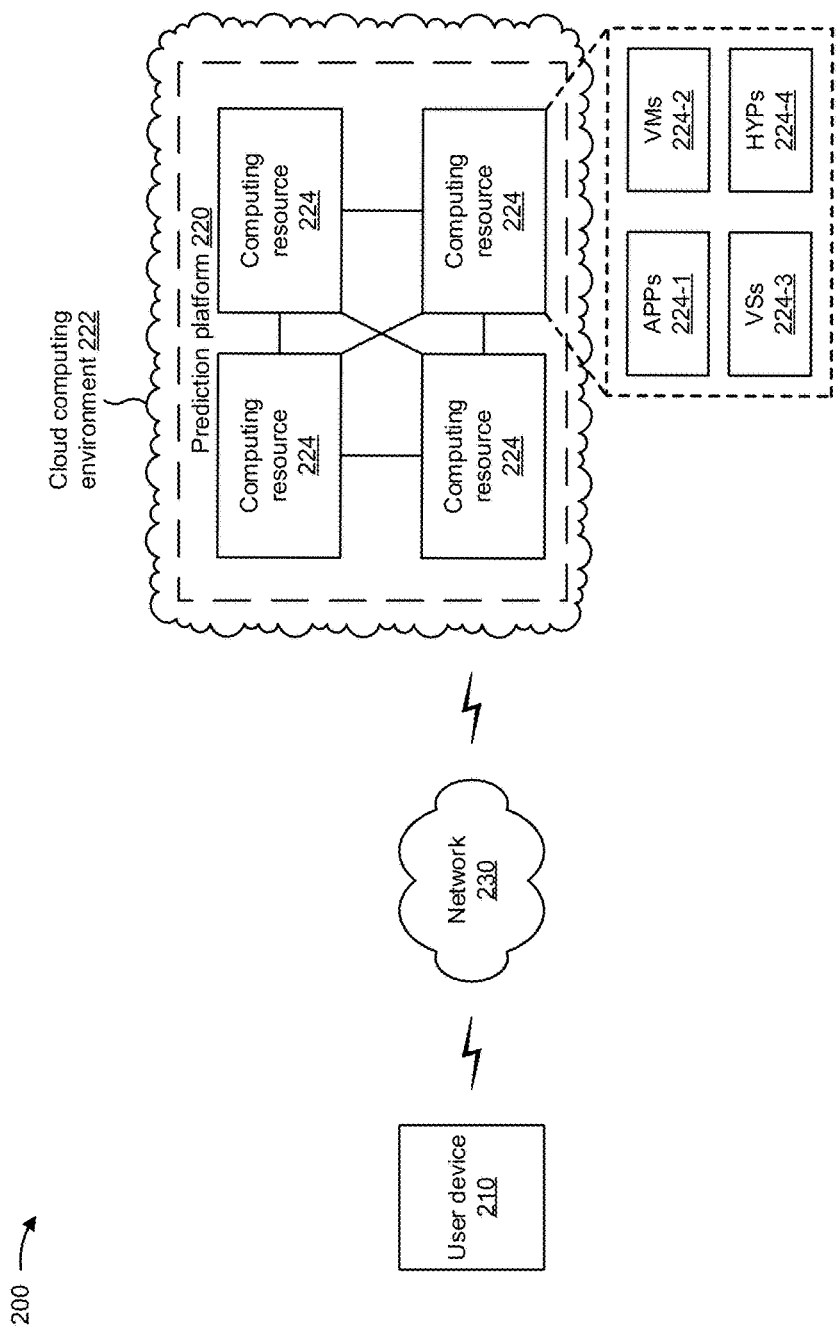
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a prediction platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to prediction platform 220.

Prediction platform 220 includes one or more devices that predicts links in knowledge graphs using ontological knowledge. In some implementations, prediction platform 220 may be designed to be modular such that certain software components may be swapped in or out depending on a particular need. As such, prediction platform 220 may be easily and/or quickly reconfigured for different uses. In some implementations, prediction platform 220 may receive information from and/or transmit information to one or more user devices 210.

In some implementations, as shown, prediction platform 220 may be hosted in a cloud computing environment 222. Notably, while implementations described herein describe prediction platform 220 as being hosted in cloud computing environment 222, in some implementations, prediction platform 220 may not be cloud-based (i.e., may be implemented outside of a cloud computing environment) or may be partially cloud-based.

Cloud computing environment 222 includes an environment that hosts prediction platform 220. Cloud computing environment 222 may provide computation, software, data access, storage, etc. services that do not require end-user knowledge of a physical location and configuration of system(s) and/or device(s) that hosts prediction platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host prediction platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with prediction platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of prediction platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
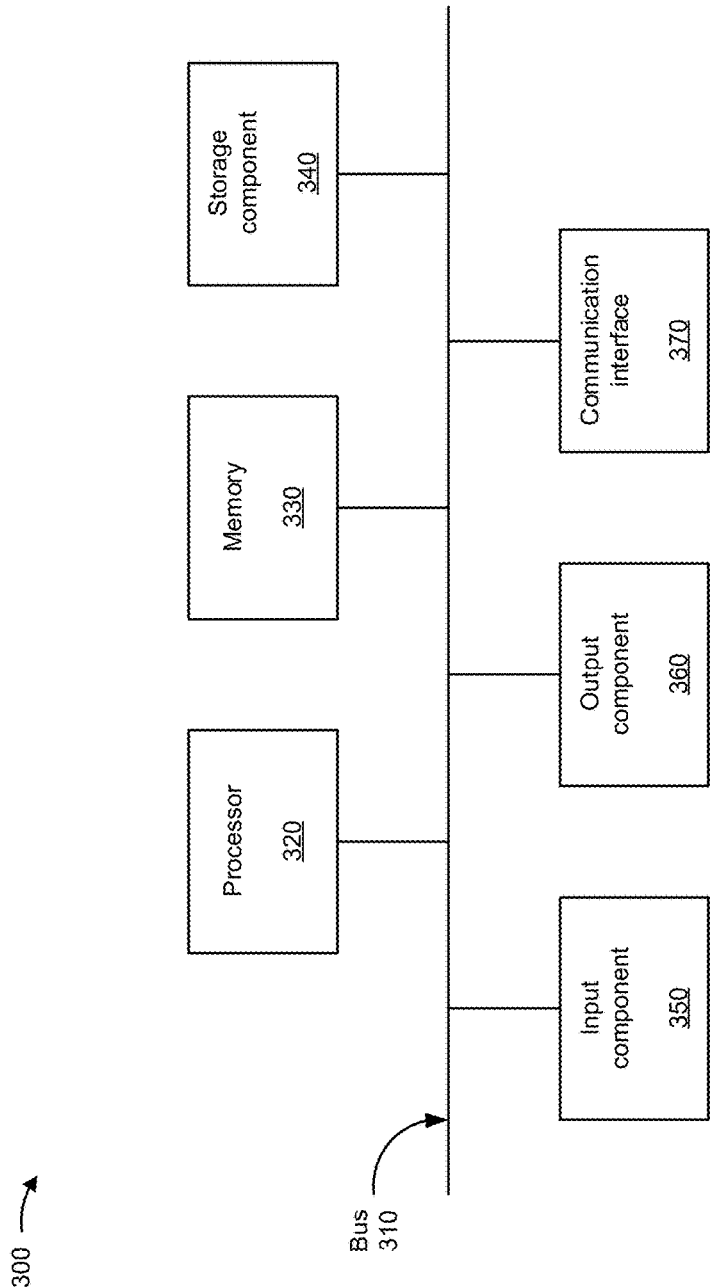
FIG. 3 is a diagram of example components of one or more devices of FIG. 2.

FIG. 3 is a diagram of example components of a device 300. Device 300 may correspond to user device 210, prediction platform 220, and/or computing resource 224. In some implementations, user device 210, prediction platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for predicting links in knowledge graphs using ontological knowledge. In some implementations, one or more process blocks of FIG. 4 may be performed by prediction platform 220. In some implementations, one or more process blocks of FIG. 4 may be performed by another device or a group of devices separate from or including prediction platform 220, such as user device 210.

As shown in FIG. 4, process 400 may include receiving training data and an ontology for the training data (block 410). For example, prediction platform 220 (e.g., using computing resource 224, processor 320, and/or the like) may receive training data and an ontology for the training data. In some implementations, a user of user device 210 may cause user device 210 to provide, to prediction platform 220, training data for training a knowledge graph associated with a particular disease (e.g., SARS). In some implementations, the user may cause user device 210 to provide, to prediction platform 220, an ontology for the training data. In some implementations, the training data and the ontology may not be stored in user device 210, but user device 210 may cause the training data and the ontology to be provided from a resource, storing the training data and the ontology, to prediction platform 220.

In some implementations, the training data may include information associated with a subject of the ontology. For example, the training data may include data indicating a disease, a cause of the disease, what organ the disease affects, symptoms of the disease, a virus identifier, a protein sequence associated with the virus, a drug identifier associated with a drug that treats the disease, a drug type, what the drug treats, and/or the like.

The ontology for the training data may include classes, types, properties, and interrelationships between data of the training data. For example, the ontology may include nodes that represent concepts related to a disease, and edges or links that show interrelationships between the concepts related to the disease.

In this way, prediction platform 220 may receive the training data and the ontology for the training data.

As further shown in FIG. 4, process 400 may include generating a knowledge graph based on the training data and the ontology (block 420). For example, prediction platform 220 (e.g., using computing resource 224, processor 320, and/or the like) may generate a knowledge graph based on the training data and the ontology. In some implementations, the training data and the ontology may be provided to a knowledge graph converter of prediction platform 220. In some implementations, the knowledge graph converter may receive the training data and the ontology, and may convert the training data from a format received by prediction platform 220 into another format. In some implementations, the knowledge graph converter may aggregate the converted training data so that the knowledge graph converter may process the aggregated data.

In some implementations, the knowledge graph converter may generate a knowledge graph based on the training data and the ontology. In some implementations, the knowledge graph converter may utilize a schema matching technique to align the training data and to integrate the aligned training data into the ontology (e.g., to generate the knowledge graph). The schema matching technique may include determining semantic correspondences between elements of two schemas (e.g., the training data and the ontology). In some implementations, the schema matching technique may analyze and compare the schema to determine correspondences among concepts and to detect possible conflicts. Once the conflicts are detected, the schema matching technique may resolve the conflicts so that merging of the schemas is possible. Once the conflicts are resolved, the schema matching technique may merge the schemas.

In some implementations, the schema matching technique may include a schema-level matching technique, an instance-level matching technique, a hybrid matching technique, a reusing matching information technique, and/or the like.

In some implementations, the knowledge graph converter may utilize other techniques to align the training data and to integrate the aligned training data into the ontology (e.g., to generate the knowledge graph), such as machine learning techniques, and/or the like.

In this way, prediction platform 220 may generate the knowledge graph based on the training data and the ontology.

As further shown in FIG. 4, process 400 may include converting the knowledge graph into knowledge graph embeddings (block 430). For example, prediction platform 220 may convert the knowledge graph into knowledge graph embeddings. In some implementations, a fit/train engine, of prediction platform 220, may receive the knowledge graph. In some implementations, the knowledge graph may be serialized into a list of statements, and the list of statements may be received by the fit/train engine. In some implementations, the fit/train engine may generate knowledge graph embeddings based on the knowledge graph. In some implementations, the knowledge graph embeddings may include points in a k-dimensional metric space, and may provide latent semantic representations for structured knowledge in the knowledge graph. In some implementations, the knowledge graph embeddings may enable direct explicit relational inferences among entities via simple calculation of embedding vectors, and may be effective at highlighting key concepts underlying sophisticated human language.

In some implementations, the fit/train engine may convert entities (e.g., nodes) and relations (e.g., links or edges) of the knowledge graph into points in a k-dimensional metric space. In some implementations, the knowledge graph embeddings may include points in a k-dimensional metric space (e.g., shown as a graph in two dimensions for simplicity). In some implementations, the fit/train engine may utilize a loss function to analyze the knowledge graph, and determine how well the knowledge graph tells positive statements from negative statements.

In some implementations, the fit/train engine may assign scores to statements of the knowledge graph in order to aid the loss function in determining how well the knowledge graph tells positive statements from negative statements. In some implementations, the fit/train engine may minimize the loss function in order to determine optimal parameters of the knowledge graph (e.g., the knowledge graph embeddings).

In this way, prediction platform 220 may convert the knowledge graph into the knowledge graph embeddings.

As further shown in FIG. 4, process 400 may include receiving new statements that include a new entity unseen in the knowledge graph (block 440). For example, prediction platform 220 (e.g., using computing resource 224, processor 320, and/or the like) may receive new statements that include a new entity unseen in the knowledge graph. In some implementations, prediction platform 220 may receive (e.g., from user device 210) new statements (e.g., that includes a new entity) indicating that SARS Type B is a disease. In some implementations, the new statements may include an ontology and a serialized representation of the ontology. In some implementations, the ontology may relate to SARS Type B. In some implementations, the serialized representation of the ontology may indicate the same information as the ontology in a different format.

In this way, prediction platform 220 may receive the new statements that include the new entity unseen in the knowledge graph.

As further shown in FIG. 4, process 400 may include generating an approximate embedding for the new entity and adding the approximate embedding to the knowledge graph embeddings (block 450). For example, prediction platform 220 (e.g., using computing resource 224, processor 320, and/or the like) may generate an approximate embedding for the new entity, and may add the approximate embedding to the knowledge graph embeddings. In some implementations, an embedding approximation engine, of prediction platform 220, may generate the approximate embedding for the new entity, and may add the approximate embedding to the knowledge graph embeddings (e.g., to generate revised knowledge graph embeddings).

In some implementations, the embedding approximation engine may approximate an embedding for the new entity based on a weight (e.g., >1), an average number of entities that are in the ontology, are related to the new entity, and are related to a schema (e.g., the knowledge graph), and an average number of entities that are in the ontology, are related to the new entity, and are not related to the schema. In some implementations, the embedding approximation engine may apply more weight to the entities of the ontology that are related to the schema than to the entities of the ontology that are not related to the schema.

In some implementations, the revised knowledge graph embeddings may include points in the k-dimensional metric space (e.g., shown as a graph in two dimensions for simplicity), and may include a point (e.g., an embedding) calculated for the new entity.

In this way, prediction platform 220 may generate the approximate embedding for the new entity, and may add the approximate embedding to the knowledge graph embeddings.

As further shown in FIG. 4, process 400 may include receiving a query for information associated with the knowledge graph (block 460). For example, prediction platform 220 (e.g., using computing resource 224, processor 320, and/or the like) may receive a query for information associated with the knowledge graph. In some implementations, a candidate generation engine, of prediction platform 220, may receive a query requesting information about a drug that has an effect on SARS Type B. In some implementations, prediction platform 220 may receive the query from user device 210 (e.g., at the request of the user of user device 210).

In this way, prediction platform 220 may receive the query for the information associated with the knowledge graph.

As further shown in FIG. 4, process 400 may include generating candidate responses to the query based on the knowledge graph (block 470). For example, prediction platform 220 (e.g., using computing resource 224, processor 320, and/or the like) may generate candidate responses to the query based on the knowledge graph. In some implementations, the candidate generation engine may analyze the query based on the knowledge graph to determine drugs that have an effect on SARS. In some implementations, the candidate generation engine may generate information indicating candidate drugs based on the query and based on the analysis with the knowledge graph. In some implementations, information indicating the candidate drugs may be generated in a particular format.

In this way, prediction platform 220 may generate the candidate responses to the query based on the knowledge graph.

As further shown in FIG. 4, process 400 may include scoring the candidate responses, based on the knowledge graph embeddings, to identify a particular candidate response (block 480). For example, prediction platform 220 (e.g., using computing resource 224, processor 320, and/or the like) may score the candidate responses, based on the knowledge graph embeddings, to identify a particular candidate response. In some implementations, a prediction engine, of prediction platform 220, may receive the revised knowledge graph embeddings and the candidate drugs. In some implementations, the prediction engine may score the candidate drugs based on the revised knowledge graph embeddings. In such implementations, the prediction engine may utilize a relational learning model (e.g., TransE, RES-CAL, ComplEx, DistMult, HolE, and/or the like) to determine values associated with the candidate drugs (e.g., distances of the candidate drugs from the point calculated for the new entity in the revised knowledge graph embeddings). The prediction engine may then utilize the values to calculate probability estimates (e.g., scores) for the candidate drugs.

In some implementations, the prediction engine may provide the scored candidate drugs in a particular format. In some implementations, the scored candidate drugs may include the information included in the candidate drugs and may also include the scores for the candidate drugs.

In some implementations, the prediction engine may calculate results for the scored candidate drugs. In some implementations, the prediction engine may utilize a predetermined threshold for a score in order to calculate the results, where if a candidate drug has a score that satisfies the predetermined threshold, the prediction engine may output that candidate drug as being a drug that has an effect on SARS Type B. In some implementations, prediction platform 220 may provide the scored candidate drugs and/or the results to user device 210, and user device 210 may display the scored candidate drugs and/or the results to a user of user device 210 (e.g., via a user interface).

In this way, prediction platform 220 may score the candidate responses, based on the knowledge graph embeddings, to identify the particular candidate response.

In some implementations, prediction platform 220 may perform a variety of actions based on the identified candidate response. For example, prediction platform 220 may automatically order the candidate drugs if there is an uptick in SARS Type B; automatically identify locations where to order the candidate drugs, provide information indicating the locations to user device 210, and allow the user of user device 210 to order the candidate drugs from the locations or request that the candidate drugs be automatically ordered from the locations; automatically identify doctors specializing in the treatment of SARS Type B; automatically make an appointment for the user of user device 210 with one of the identified doctors; provide information indicating the identified doctors to the user of user device, and allow the user of user device 210 to make an appointment with one of the identified doctors or request that the appointment be automatically made for the user; and/or the like Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a prediction platform that predicts links in knowledge graphs using ontological knowledge and without retraining the knowledge graphs. For example, the prediction platform may receive training data and an ontology for the training data, and may generate a knowledge graph based on the training data and the ontology. The prediction platform may convert the knowledge graph into knowledge graph embeddings, and may receive new statements (e.g., new entities) that are not present in the training data and the knowledge graph embeddings. The prediction platform may generate approximate embeddings for each new entity, and may generate revised knowledge graph embeddings that include the new statements. The prediction platform may receive a query for information associated with the knowledge graph, and may generate candidate responses to the query based on the knowledge graph. The prediction platform may score the candidate responses based on the revised knowledge graph embeddings, and may identify a particular candidate response, that best answers the query, based on scoring the candidate responses.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      receive training data and an ontology for the training data,
         the training data including information associated with a subject of the ontology;
      generate a knowledge graph based on the training data and the ontology;
      convert the knowledge graph into knowledge graph embeddings,
         the knowledge graph embeddings including points in a k-dimensional metric space;
      receive additional ontology information;
      identify a new entity, in the additional ontology information, that is not present in the knowledge graph embeddings,
         the additional ontology information including an entity related to a particular knowledge graph embedding of the knowledge graph embeddings;
      generate a new embedding of the new entity based on:
         a first average quantity of entities that are related to the knowledge graph and the new entity, and
         a second average quantity of entities that are related to the new entity and are not related to the knowledge graph;
      add the new embedding to the knowledge graph embeddings by associating the new embedding with the particular knowledge graph embedding; and
      utilize the knowledge graph embeddings, with the new embedding, to perform an action.

2. The device of claim 1, where the one or more processors are further to:
   utilize a schema matching technique to determine semantic correspondences between the training data and the ontology;
   and
   where the one or more processors, when generating the knowledge graph, are to:
      generate the knowledge graph based on utilizing the schema matching technique.

3. The device of claim 1, where the knowledge graph includes:
   nodes that represent concepts, and
   links representing relations between the concepts.

4. The device of claim 1, where the one or more processors, when generating the new embedding, are to:
   approximate the new embedding based on a weight.

5. The device of claim 1, where the one or more processors, when utilizing the knowledge graph embeddings to perform the action, are to:
   receive a query for information associated with the knowledge graph;
   generate candidate responses to the query based on the knowledge graph;
   score the candidate responses based on the knowledge graph embeddings; and
   identify a particular candidate response, of the candidate responses, based on scores for the candidate responses.

6. The device of claim 1, where the one or more processors are further to:
   infer another new entity, that is not present in the knowledge graph embeddings, based on the new entity; and
   generate revised knowledge graph embeddings that include the other new entity.

7. The device of claim 1, where the ontology relates to a particular domain and includes classes and properties.

8. A non-transitory computer-readable medium storing instructions, the instructions comprising:
   one or more instructions that, when executed by one or more processors, cause the one or more processors to:
      receive a knowledge graph that is generated based on training data and an ontology for the training data,
         the training data including information associated with a subject of the ontology, and
         the ontology including:
            classes, and
            properties;
      convert the knowledge graph into knowledge graph embeddings,
         the knowledge graph embeddings including points in a k-dimensional metric space;
      receive additional ontology information;
      identify a new entity, in the additional ontology information, that is not present in the knowledge graph embeddings;
      generate revised knowledge graph embeddings that include an embedding for the new entity based on:
         a first average quantity of entities that are related to the knowledge graph and the new entity, and
         a second average quantity of entities that are related to the new entity and are not related to the knowledge graph;
      receive a query for information associated with the knowledge graph;
      generate candidate responses to the query based on the knowledge graph;
      score the candidate responses based on the revised knowledge graph embeddings; and
      identify a particular candidate response, of the candidate responses, based on scores for the candidate responses.

9. The non-transitory computer-readable medium of claim 8, where the knowledge graph is generated based on a schema matching technique that determines semantic correspondences between the training data and the ontology.

10. The non-transitory computer-readable medium of claim 8, where the knowledge graph includes:
    nodes that represent concepts, and
    links representing relations between the concepts.

11. The non-transitory computer-readable medium of claim 8, where the one or more instructions, when executed by the one or more processors, further cause the one or more processors to:

approximate the embedding for the new entity based on a weight greater than one,
the weight being applied to the first average quantity of entities; and
where the one or more instructions, that cause the one or more processors to generate the revised knowledge graph embeddings, cause the one or more processors to:
generate the revised knowledge graph embeddings based on approximating the embedding for the new entity.

12. The non-transitory computer-readable medium of claim 8, where the instructions further comprise:
one or more instructions that, when executed by the one or more processors, cause the one or more processors to:
infer another new entity, that is not present in the knowledge graph embeddings, based on the new entity; and
generate another revised knowledge graph embeddings that include the other new entity.

13. The non-transitory computer-readable medium of claim 8, where the ontology relates to a particular domain.

14. The non-transitory computer-readable medium of claim 8, where the instructions further comprise:
one or more instructions that, when executed by the one or more processors, cause the one or more processors to:
utilize a relational learning model to determine values associated with the candidate responses; and
utilize the values to score the candidate responses.

15. A method, comprising:
receiving, by a device, training data and an ontology for the training data,
the training data including information associated with a subject of the ontology, and
the ontology including:
classes, and
properties;
generating, by the device, a knowledge graph based on the training data and the ontology;
converting, by the device, the knowledge graph into knowledge graph embeddings,
the knowledge graph embeddings including points in a k-dimensional metric space;
receiving, by the device, additional ontology information;
identifying, by the device, a new entity in the additional ontology information that is not present in the knowledge graph embeddings;

generating, by the device, revised knowledge graph embeddings that include a new embedding for the new entity based on:
a first average quantity of entities that are related to the knowledge graph and the new entity, and
a second average quantity of entities that are related to the new entity and are not related to the knowledge graph; and
utilizing, by the device, the revised knowledge graph embeddings to perform an action.

16. The method of claim 15, further comprising:
utilizing a schema matching technique to determine semantic correspondences between the training data and the ontology;
and
where generating the knowledge graph comprises:
generating the knowledge graph based on utilizing the schema matching technique.

17. The method of claim 15, where the knowledge graph includes:
nodes that represent concepts, and
links that show relations between the concepts.

18. The method of claim 15, further comprising:
approximating the new embedding for the new entity based on a weight; and
where generating the revised knowledge graph embeddings comprises:
generating the revised knowledge graph embeddings based on approximating the new embedding for the new entity.

19. The method of claim 15, where utilizing the revised knowledge graph embeddings to perform the action, are to:
receiving a query for information associated with the knowledge graph;
generating candidate responses to the query based on the knowledge graph;
scoring the candidate responses based on the revised knowledge graph embeddings; and
identifying a particular candidate response, of the candidate responses, based on scores for the candidate responses.

20. The method of claim 15, further comprising:
inferring another new entity, that is not present in the knowledge graph embeddings, based on the new entity; and
generating another revised knowledge graph embeddings that include the other new entity.

* * * * *